US 6,662,188 B1

(12) United States Patent
Rasmussen et al.

(10) Patent No.: US 6,662,188 B1
(45) Date of Patent: Dec. 9, 2003

(54) METADATA MODEL

(75) Inventors: Glenn D. Rasmussen, Nepean (CA); Henk Cazemier, Nepean (CA)

(73) Assignee: Cognos Incorporated, Ottawa (CA)

( * ) Notice: Subject to any disclaimer, the term of this patent is extended or adjusted under 35 U.S.C. 154(b) by 53 days.

(21) Appl. No.: 09/653,035

(22) Filed: Sep. 1, 2000

(51) Int. Cl.[7] .............................................. G06F 17/30
(52) U.S. Cl. ..................... 707/102; 707/4; 707/201; 709/204
(58) Field of Search .............................. 707/4, 10, 100, 707/102, 201, 514, 3, 5, 104.1, 103 Y, 531; 709/204, 315, 201; 705/1; 717/108, 113, 114, 100, 120

(56) References Cited

U.S. PATENT DOCUMENTS

| | | | | |
|---|---|---|---|---|
| 5,734,887 A | * | 3/1998 | Kingberg et al. | 707/100 |
| 5,748,975 A | * | 5/1998 | Van De Vanter | 707/514 |
| 5,857,197 A | * | 1/1999 | Mullins | 707/102 |
| 5,966,707 A | * | 10/1999 | Van Huben et al. | 707/10 |
| 6,240,422 B1 | * | 5/2001 | Atkins et al. | 707/102 |
| 6,327,594 B1 | * | 12/2001 | Van Huben et al. | 707/10 |
| 6,370,539 B1 | * | 4/2002 | Ashby et al. | 707/102 |
| 6,374,263 B1 | * | 4/2002 | Bunger et al. | 707/201 |
| 6,411,961 B1 | * | 6/2002 | Chen | 707/102 |

* cited by examiner

Primary Examiner—Charles Rones
Assistant Examiner—Hassan Mahmoudi
(74) Attorney, Agent, or Firm—Gardner Groff, P.C.

(57) ABSTRACT

A metadata model defines model objects to represent one or more data sources. The metadata model comprises a data access layer, a business layer and a package layer. The data access layer contains data access model objects. The data access model objects include a data access model object that describes how to retrieve data from the data sources. The business layer contains business model objects. The business model objects include a business model object that describes a business view of data in the data sources. The package layer contains package model objects which reference subsets of business model objects.

31 Claims, 3 Drawing Sheets

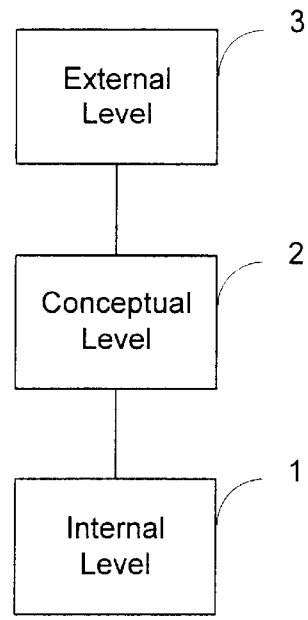
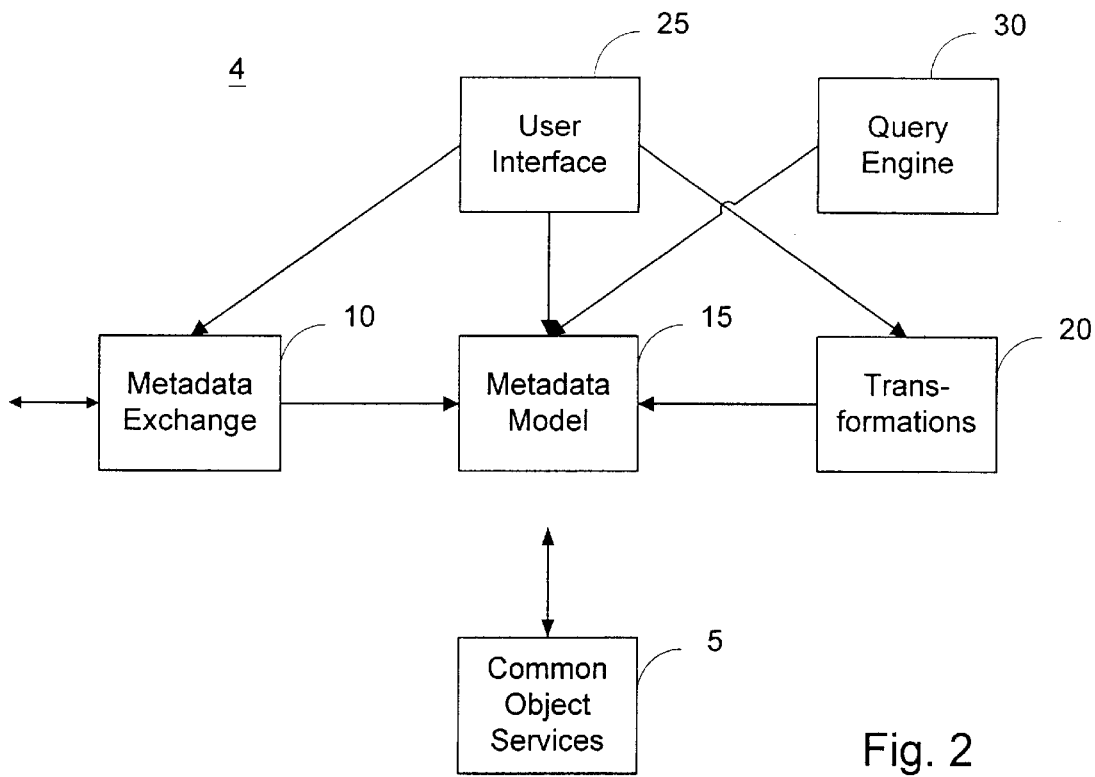

METADATA MODEL

FIELD OF THE INVENTION

The present invention relates generally to a metadata model, and more particularly to a metadata model which is suitably used in a reporting system that access a plurality of data stores including relational databases.

BACKGROUND OF THE INVENTION

It is known to use data processing techniques to design information systems for storing and retrieving data. Data is any information, generally represented in binary, that a computer receives, processes, or outputs. A database or data warehouse is a shared pool of interrelated data. Information systems are used to store, manipulate and retrieve data from databases.

Traditionally, file processing systems were often used as information systems. File processing systems usually consist of a set of files and a collection of application programs. Permanent records are stored in the files, and application programs are used to update and query the files. Such application programs are generally developed individually to meet the needs of different groups of users. Information systems using file processing techniques have a number of disadvantages. Data is often duplicated among the files of different users. The lack of coordination between files belonging to different users often leads to a lack of data consistency. Changes to the underlying data requirements usually necessitate major changes to existing application programs. There is a lack of data sharing, reduced programming productivity, and increased program maintenance. File processing techniques, due to their inherent difficulties and lack of flexibility, have lost a great deal of their popularity and are being replaced by database management systems (DBMSs).

A DBMS is a software system for assisting users to create reports from data stores by allowing for the definition, construction, and manipulation of a database. The main purpose of a DBMS system is to provide data independence, i.e., user requests are made at a logical level without any need for knowledge as to how the data is stored in actual files in the database. Data independence implies that the internal file structure could be modified without any change to the users' perception of the database. However, existing DBMSs are not successful in providing data independence, and requires users to have knowledge of physical data structures, such as tables, in the database.

To achieve better data independence, it is proposed to use three levels of database abstraction in "The Electrical Engineering Handbook" Richard C. Dorf, CRCnetBASE 1999, section 94.1. With respect to the three levels of database abstraction, reference is made to FIG. 1.

The lowest level in the database abstraction is the internal level 1. In the internal level 1, the database is viewed as a collection of files organized according to an internal data organization. The internal data organization may be any one of several possible internal data organizations, such as $B_+$-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the DBMS. When the data structure or file organization of the database is changed, the internal level 1 is also changed. When changes to the internal level 1 do not affect the conceptual level 2 and external level 3, the DBMS is said to provide for physical data independence. When changes to the conceptual level 2 do not affect the external level 3, the DBMS is said to provide for logical data independence.

Typical DBMSs use a data model to describe the data and its structure, data relationships, and data constraints in the database. Some data models provide a set of operators that are used to update and query the database. DBMSs may be classified as either record based systems or object based systems. Both types of DBMSs use a data model to describe databases at the conceptual level 2 and external level 3.

Data models may also be called metadata models as they store metadata, i.e., data about data in databases.

Three main existing data models used in record based systems are the relational model, the network model and the hierarchical model.

In the relational model, data is represented as a collection of relations. To a large extent, each relation can be thought of as a table. A typical relational database contains catalogues, each catalogue contains schemas, and each schema contain tables, views, stored procedures and synonyms. Each table has columns, keys and indexes. A key is a set of columns whose composite value is distinct for all rows. No proper subset of the key is allowed to have this property. A table may have several possible keys. Data at the conceptual level 2 is represented as a collection of interrelated tables. The tables are normalized so as to minimize data redundancy and update anomalies. The relational model is a logical data structure based on a set of tables having common keys that allow the relationships between data items to be defined without considering the physical database organization.

A known high level conceptual data model is the Entity-Relationship (ER) model. In an ER model, data is described as entities, attributes and relationships. An entity is anything about which data can be stored. Each entity has a set of properties, called attributes, that describe the entity. A relationship is an association between entities. For example, a professor entity may be described by its name, age, and salary and can be associated with a department entity by the relationship "works for".

Existing information systems use business intelligence tools or client applications that provide data warehousing and business decision making and data analysis support services using a data model. In a typical information system, a business intelligence tool is conceptually provided on the top of a data model, and underneath of the data model is a database. The data model of existing information systems typically has layers corresponding to the external level 3 and the internal level 1. Some data models may use a layer corresponding to both the external level 3 and the conceptual level 2.

Existing data models are used for the conceptual design of databases. When a system designer constructs an information system, the designer starts from a higher abstraction level 3 and moves down to a lower abstraction level 1, as symbolized in FIG. 1 by arrows.

That is, the system designer first performs logical design. At the logical design stage, the designer considers entities of interest to the system users and identifies at an abstract level information to be recorded about entities. The designer then determines conceptual scheme, i.e., the external level 3 and/or conceptual level 2 of a data model. After the logical design is completed, the designer next performs physical design. At the physical design stage, the designer decides how the data is to be represented in a database. The designer then creates the corresponding storage scheme, i.e., the structure of a database, and provides mapping between the internal level 1 of the data model and the database.

Existing business intelligence tools thus each provides a different paradigm for retrieving and delivering information from a database. Accordingly, it is difficult to share information in the database among different business intelligence tools.

It is common that in a single organization, each group of users has its own established information system that uses its corresponding database. Thus, the single organization often has multiple databases. Those databases often contain certain types of information which are useful for multiple groups of users. Such types of information may include information about business concepts, data retrieval, and user limits and privileges. However, each information system was designed and constructed in accordance with specific needs of the group, and may use a different business intelligence tool from others. These differences in the information systems and business intelligence tools used do not allow sharing the information already existing in the databases among multiple groups of users.

Accordingly, it is desirable to provide a data model or metadata model which can realize the three abstraction levels and provide information that can be shared by multiple users who use those different business intelligence tools or client applications.

SUMMARY OF THE INVENTION

The present invention provides a metadata model that have three layers of different abstraction levels.

According to one aspect of the present invention, there is provided a metadata model that defines model objects to represent one or more data sources. The metadata model comprises a data access layer, a business layer and a package layer. The data access layer contains data access model objects. The data access model objects include a data access model object that describes how to retrieve data from the data sources. The business layer contains business model objects. The business model objects include a business model object that describes a business view of data in the data sources. The package layer contains package model objects. The package model objects include a package model object which references a subset of business model objects.

According to another aspect of the present invention, there is provided a metadata model that contains model objects representing one or more data sources. The data sources contain tables having columns. The metadata model comprises a data access layer, a business layer and a package layer. The data access layer contains data access model objects. The data access model objects include table objects that describe definitions of the tables contained in the data sources, and column objects that describe definitions of the columns of the tables contained in the data sources. The business layer contain business model objects. The business model objects include entities that are constructed based on the table objects in the data access layer, and attributes that are constructed based on the column objects in the data access layer. The package layer contains package model objects. The package model objects include a package model object that reference a subset of the business model objects.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which:

FIG. 1 is a diagram showing an example of database abstractions;

FIG. 2 is a diagram showing an example of a reporting system to which an embodiment of the present invention is applied;

DETAILED DESCRIPTION OF EMBODIMENTS OF THE INVENTION

Figure 2A:
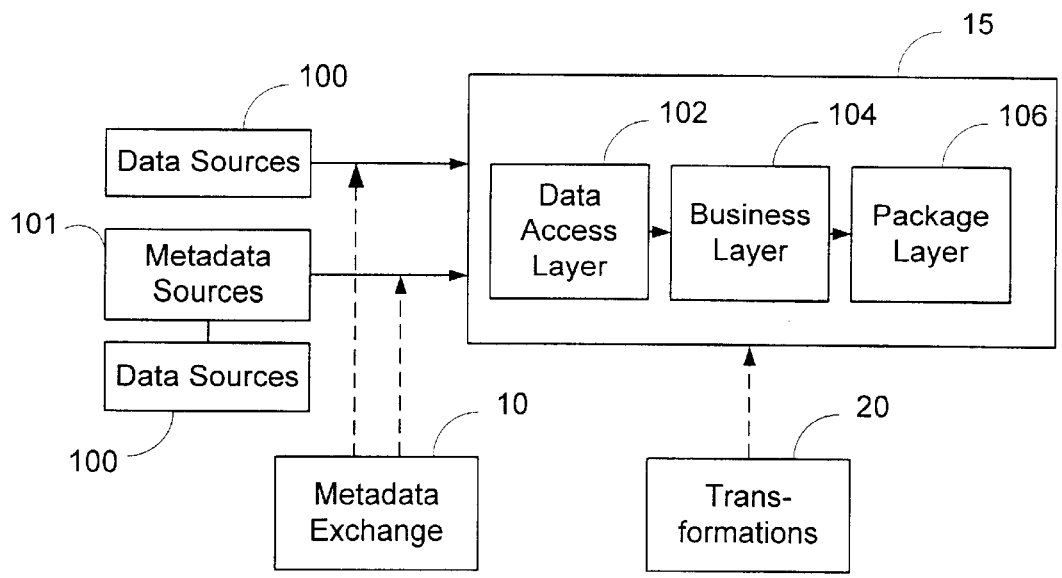
FIG. 2A is a diagram showing functions of the metadata exchange, metadata model and transformations shown in FIG. 2.

FIG. 2 illustrates a reporting system 4 to which an embodiment of the present invention is suitably applied. The reporting system 4 provides a single administration point for metadata that supports different business intelligence tools or client applications. Thus, it enables different business intelligence tools to extract and interpret data from various data sources in the same way.

The reporting system 4 includes common object services (COS) 5, a metadata exchange 10, a metadata model 15, a metadata model transformer or transformations 20, a user interface 25 and a query engine 30. The fundamental objective of the reporting system 4 is to provide a rich business-oriented metadata model 15 that allows the query engine 30 to generate the best queries of which it is capable, and allows users to build queries, reports and cubes with the aid of the query engine 30 to obtain desired reports from underlying data sources. To this end, COS 5, metadata exchange 10 and transformations 20 are provided.

Prior to describing the metadata model 15 and the transformations 20 in detail, each element of the reporting system 4 is briefly described.

COS 5 defines the framework for object persistence. Object persistence is the storage, administration and management of objects on a physical device and transfer of those objects to and from memory as well as the management of those objects on the physical device. The double head arrow from COS 5 in FIG. 2 represents that COS 5 communicates with all other elements shown in FIG. 2. COS 5 performs functions such as creating new objects, storing them on disk, deleting them, copying them, moving them, handling change isolation (check-in, check-out) and object modelling. COS 5 uses a modelling language, such as Comet Modelling Language (CML) that generates C++ code.

The metadata exchange 10 is used to obtain metadata from external physical sources. Metadata is obtained from one or more external sources of metadata. As shown in FIG.

2A, external sources of metadata may be one or more data sources 100 and/or one or more metadata sources 101. Data sources 100 contain physical data. Examples of data sources 100 include databases and files. Metadata sources 101 contain descriptive information about data sources. Metadata sources 101 are also known as metadata repositories. Metadata repositories may be third party repositories. Metadata sources 101 generally have underlying data sources 100 containing physical data. The metadata exchange 10 facilitates importation of metadata from external sources 100 and 101 into the metadata model 15. Also, the metadata exchange 10 may facilitates exportation of metadata from the metadata model 15 to external metadata repositories.

The metadata model 15 stores metadata about its underlying one or more data sources 100. It is used to provide a common set of business-oriented abstractions of the underlying data sources 100. The metadata model 15 defines the objects that are needed to define client applications that users build. The metadata model 15 provides three layers to realize three levels of abstractions of data sources 100 as described above referring to FIG. 1. The three layers are a physical layer or data access layer 102, a business layer 104 and a presentation layer or package layer 106.

Transformations 20 are used to complete the metadata model 15. For example, when a database is introduced to the reporting system 4, metadata is imported from the database into the metadata model 15. Metadata may also be imported from one or more metadata repositories or other data sources. Sufficient metadata may be imported from a database that would build only a small number of the objects that would actually be needed to execute queries. However, if such metadata does not have good mapping to the metadata model 15, then the transformations 20 can be used to provide the missing pieces to complete the metadata model 15.

The user interface 25 is layered on top of the metadata model 15 as a basic maintenance facility. The user interface 25 provides users with the ability to browse through the metadata model 15 and manipulate the objects defined thereby. The user interface 25 is also a point of control for the metadata exchange 10, for executing transformations 20, and for handling check-in, check-out of model objects, i.e., changed information, as well as a variety of other administrative operation. The user interface 25 allows users for the performance of basic maintenance tasks on the objects in the metadata model 15, e.g., changing a name, descriptive text, or data type. The user interface 25 is a mechanism that involves the capabilities of the metadata exchange 10 and the transformations 20. The user interface 25 has the ability to diagram the metadata model 15, so that the user can see how objects are related.

The query engine 30 is responsible for taking the metadata model 15 and a user's request for information, and generating a query that can be executed against the underlining data sources, e.g., a relational database. The query engine 30 is basically the reason for the existence of the rest of the blocks. The objective of the query engine 30 is to function as efficiently as possible and to preserve the semantics of the original question. A user may ask a question that is not precise. The request may be for something from "customers" and something from "products". But these may be related in multiple ways. The query engine 30 needs to figure out which relationship is used to relate "customers" and "products" to provide the user with information requested.

Figure 3:
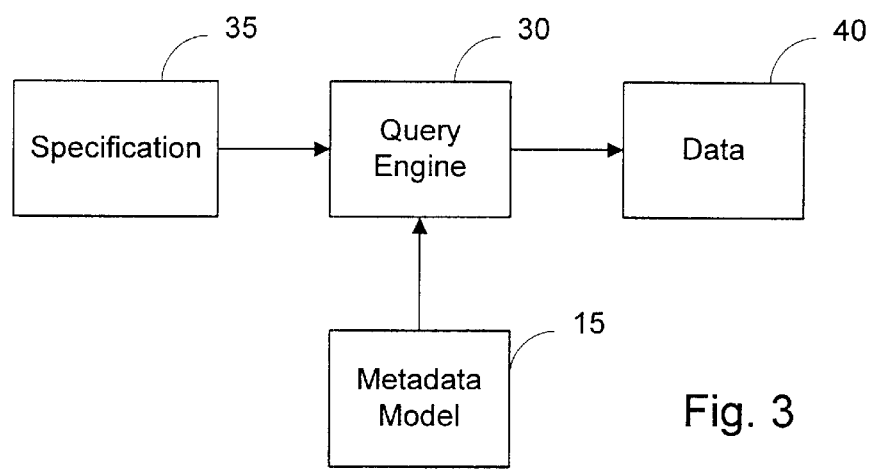
FIG. 3 is a diagram showing an example of a query engine that uses the metadata model shown in FIG. 2.

The use of the metadata model 15 by the query engine 30 is briefly described with reference to FIG. 3. A user uses a business intelligent tool or client application (not shown) to generate a user's request for information. Upon the receipt of the user's request, the client application generates an initial specification 35 based on the request. The specification 35 may be ambiguous. Also, it in not in a form that can be applied to the data sources directly. Using the information that is built in the metadata model 15, the query engine 30 makes the specification 35 unambiguous and builds a query in terms of the data access layer 102 for the specification 35. This intermediate formulation of the query is also called a physical query and is subsequently translated into a data source specification language. The data source specification language may be Structured Query Language (SQL). A query in a data source specification language can be executed on the data sources. Thus, the correct data 40 may be obtained.

Metadata Model 15

The metadata model 15 is a tool to supply the common metadata administration tool, unified and centralized modelling environment, and application program interfaces for business intelligence tools. The architecture of the metadata model 15 will now be described in further detail.

Metadata contained in the metadata model 15 is also called model objects. The metadata model 15 is organized as a single containment tree or a series of containment trees. A containment tree starts at the highest level with a model object. The model object itself is at the root of the tool, and all other objects, except the relationship objects, are contained within this root object.

Figure 2B:
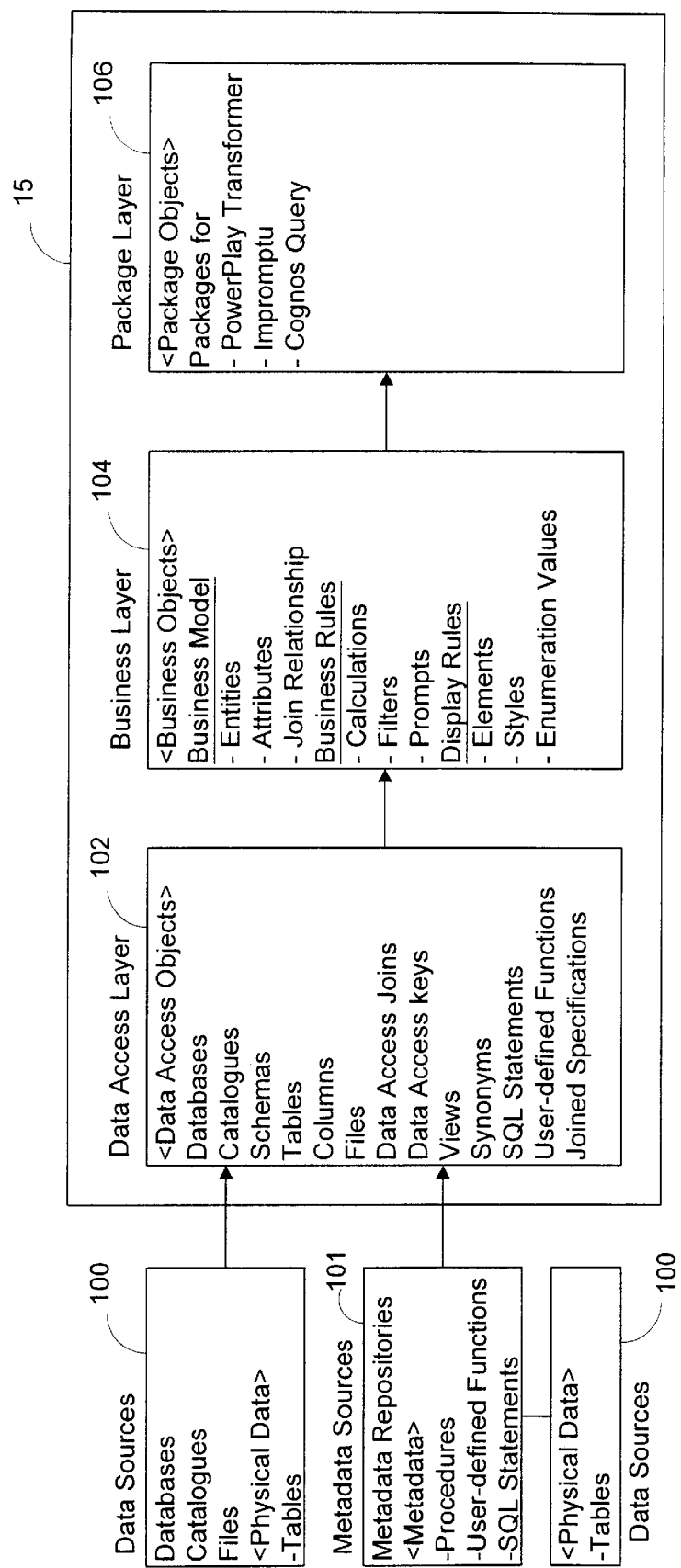
FIG. 2B is a diagram showing examples of objects contained in the metadata model shown in FIG. 2.

FIG. 2B shows the architecture of the metadata model 15. The metadata model 15 is composed of several layers, namely, a physical layer or data access layer 102, a business layer 104 and a presentation layer or package layer 106. These layers correspond to those abstraction levels shown in FIG. 1.

The model objects contained in a higher abstraction layer may include objects which are constructed from a lower abstraction layer to the higher abstraction layer The data access layer 102 contains metadata that describes how to retrieve physical data from data sources 100. It is used to formulate and refine queries against the underlying data sources 100. The underlying data sources 100 may be a single or multiple data sources, as described above. Examples of data sources 100 include relational databases, such as Oracle, Sybase, DB2, SQL Server and Informix.

The data access layer 102 contains a part of the model objects that directly describe actual physical data in the data sources 100 and their relationships. These model objects may be called data access model objects. The data access model objects may include, among other things, databases, catalogues, schemas, tables, files, columns, data access keys, indexes and data access joins. Each table has one or more columns. Data access joins exist between tables. A data access key corresponds to a key in the data sources 100 that references one or more column names whose composite value is distinct for all rows in a table. A data access join is a relationship between two or more tables or files. Also, the data access model objects may include views, function stored procedures and synonyms, if applicable.

The data access model objects in the data access layer 102 are metadata, which are created as a result of importing metadata from data sources 100 and metadata sources 101 provided by users. Examples of metadata sources 101 include Impromptu Catalogue and Impromptu Web Query 2.12. The information of some data access objects may be available from the underlying data sources 100. Information for join relationships are not available from the underlying data sources 100. The user can customize some objects in the data access layer 102 in order to create data access joins, i.e., relationships between objects that were imported from various data sources. Also, the transformations 20 may transform the data access layer 102 to complete it.

Also, the data access layer 102 may allow users to define therein data source queries, such as SQL queries. Data source queries return a result set of physical data from underlying data sources 100. Those created data source queries are treated as objects in the data access layer 102 like tables. After data source queries are defined, a set of columns objects is generated for each data source query by the query engine 30 based on the SQL statement. Users may also define stored procedures and/or overloaded stored procedures, rather than importing them from metadata sources 101.

The business layer 104 describes the business view of the physical data in the underlying data sources 100. It is used to provide business abstractions of the physical data with which the query engine 30 can formulate queries against the underlying data sources 100.

The business layer 104 contains a part of the model objects that can be used to define in abstract terms the user's business entities and their inter relationships. These model objects may be called business model objects. The business model objects are reusable objects that represent the concepts and structure of the business to be used in business intelligence environments. They represent a single business model, although they can be related to physical data in a number of different data sources 100.

The business model objects consist of a business model, business rules and display rules. The business model may include entities, attributes, keys and joins. Joins may be also called join relationships. The user interface 25 can provide a view of the business model as an entity-relationship diagram. The business rules may include calculations, filters and prompts. The display rules may include elements, styles and enumeration values.

The business model objects are closely related to the data access model objects in the data access layer 102. For example, entities in the business layer 104 are related to tables in the data access layer 102 indirectly; and attributes in the business layer 104 correspond to columns in the data access layer 102. Business joins exist between entities. Each business model object has a partner in the data access layer 102, i.e., a relationship exists between a table and an entity. While the tables in the data sources 100 store data access layer objects in accordance with the design of its underlying data sources 100, the entities in the business layer 104 hold the metadata representing the business concept. Entities are collections of attributes.

Attributes of entities in the business layer 104 contain expressions related to columns of tables in the data access layer 102. An attribute is usually directly related to a single column of the data access layer 102. For example, the entity "customer" could have attributes "customer name", "customer address", and the like. In the simplest case, all the attributes of an entity in the business layer 104 are related one-to-one to the columns of a single table in the data access layer 102. However, the relationship is not always a one-to-one relationship. Also, an attribute may be expressed as a calculation based on other attributes, constants and columns. For example, an attribute may be a summary of data in other attributes, e.g., a total amount of all the orders placed by customer.

In the business layer 104, entities are related to other entities by joins. Joins are classified as one of containment, reference or association. A containment join represents a strong relationship between entities. For example, an entity OrderDetail would have no meaning without an entity OrderHeader. Thus, the entity OrderDetail is containment of the entity OrderHeader.

A reference join indicates that one entity acts as a lookup table with respect to the other. For example, OrderDetail and Products are related via a relationship. In this case, Products acts as a lookup table so the relationship is marked as a reference relationship.

An association join represents relationships between entities which are not categorised as containment or reference joins.

It is advantageous to categorize the joins into these three types because they should be treated differently when query paths are considered. For example, a reference join should not be taken as a query path because if multiple entities reference to an entity, the referenced entity could incorrectly relate the unrelated multiple entities to each other by a query path through the referenced entity. By identifying reference joins as such, query paths can easily avoid these joins.

In addition, an entity may inherit information from another entity using a technique called subtyping. A subtype entity may be specialization of its supertype entity. For example, an entity Employee is a supertype entity for a subtype entity Salesman. Generally, a subtype entity has more attributes than its supertype. In the above example, the entity Employee may have attributes EmployeeNumber, Name, and Salary; and the entity Salesman may have attributes Quota, Sales and Commission in addition to EmployeeNumber, Name, and Salary.

Entities and attributes in the business layer 104 are given user friendly meaningful names. For example, the column named CUSTNAM from the CUST table in the data access layer 102 could be mapped to Customer Name attribute contained in the Customer Entity in the business layer 104.

The ways of use of entity relationships in the metadata model 15 are different from those in conventional modelling tools. For example, in most Entity-Relationship (ER) modelling tools, the ER concept is used to provide an abstraction for defining a physical database, i.e., it is a different "view" of the physical database. Within the metadata model 15, the business layer 104 is used to provide an abstraction for reporting data from physical data sources 100.

The information of the objects of the business model in the business layer 104 is not generally available in underlying data sources 100. Usually available information in metadata sources 101 is associated with the data access layer 102, rather than the business layer 104. One thing that may be available in external metadata repositories 101 is the business names for objects in the metadata model 15. However, again these business names tend to be provided for the physical tables and columns. If they can be mapped to the appropriate business entity or attribute, they may be used.

The business rules are used to develop business intelligence applications. Calculations use a combination of attributes and expression components, and make them available to report so that the up-to-date and consistent definitions are used to execute reports.

Filters and prompts are used to restrict queries. Applying a filter to an entity or attribute limits the scope of data retrieval for all users who work with this entity or attribute. Applying a filter to an entity or attribute in conjunction with a user class limits the scope of data retrieval for the user class. Elements and styles are used to associate presentation information with an attribute.

The package layer 106 contains a part of the model objects that describe subsets of the business layer 104. These model objects may be called package model objects. These are used to provide an organized view of the information in the business layer 104. The information is organized in terms of business subject areas or by way in which it is used.

The package model objects in the package layer 106 include presentation folders and/or subjects. Each subject in the package layer 106 contains references to a subset of the business model objects that are interested in a particular group or class of users. The subset of the business model objects are reorganized so that they can be presented to the group of users in a way suitable to the group of users. Also, a user can combine references to the business model objects available from the business layer 104 into combinations that are frequently used in the user's business. User defined folders that contain these combinations of references are called user folders or presentation folders.

Presentation folders and subjects contain references to objects in the business layer 104, including entities, attributes, filters and prompts. Presentation folders create packages of information for the end user. Each package is defined for a specific purpose, e.g., one or more business intelligence applications. Designers can combine them, by functions of subjects or by group of users, in order to organize business model objects into collections of most frequently used objects, or in order to support various business intelligent tools or client applications using the reporting system 4 of the present invention as a metadata provider.

The information of the objects in the package layer 106 is not generally available in external data sources 100. The concept of organized business subject areas may exist in external metadata repositories 101. The metadata model 15 may use such a concept in the business layer or data access layer.

For all objects in the data access layer 102 and the business layer 104, business descriptive metadata may also be included. Business descriptive metadata is used to help understand the source and the meaning of the data which is being manipulated. Business descriptive metadata may include lineage, accuracy, description and refresh rules. Lineage is a history of source and processing steps used to produce data set. Refresh is update rules for refreshing aggregated or submitted data for reporting. Business descriptive metadata is used by an end user and an application designer to understand the source of the information. Business descriptive metadata includes such things as descriptions and stewards. A steward is a person or group that manages the development, approval, creation, and use of data within a specified functional area. Business descriptive metadata may also include information that can be used to relate the objects to information in external repositories 101.

Business descriptive metadata may exist in many forms in external repositories 101. General purpose repositories and business information directories collect this information as that is their raison d'etre. Warehouse Extract-Transform-Load (ETL) tools collect this information as a result of collecting the ETL specifications. The information may be duplicated or collected from a variety of sources in the metadata model 15 so that it is available directly to the user as metadata. The metadata model 15 may also include context information which can be used to retrieve information from external repositories 101.

Most objects in the metadata model 15 may be organized in a tree. Some objects model relationships between other objects. As described above, each business model object in the business layer 104 has a partner in the data access layer 102. This relationship provides the context for processing all the related information of the tables in the data access layer 102. For example, if a particular column has not been processed, transformations 20 process the column in the context of a parent relationship, i.e., build an attribute and put under the entity.

The metadata model 15 may be built using CML files. CML files are compiled into C++ code which is then compiled in the reporting system 4 to build the metadata model 15.

Common Object Services 5

Referring back to FIG. 2, COS 5 will now be described in further detail. COS 5 is not part of the metadata model 15. Rather, it provides a secure layer around the metadata model 15. Actions on objects in the metadata model 15 cannot be performed without the involvement of COS 5. COS 5 communicates with the underlying repository where the metadata model 15 is stored.

The metadata model 15 can be accessed by many users at the same time. Anything that a user would manipulate, such as an entity or an attribute, is represented as an object in the metadata model 15. Each user may change objects or their properties, thereby changing the metadata model 15. Most of the objects in the metadata model 15 are part of different kinds of relationships, and changes may cause inconsistency in the metadata model 15 if the changes are made without a mechanizm for providing consistency.

COS 5 provides the means of preserving the semantic integrity of the metadata model 15. COS 5, provides access to the objects within the repository where the metadata model 15 is stored; performs validation checks, insuring precision object storage; provides user security checks; oversees the changes to the objects; and participates in the creating of new object and deleting of existing ones.

COS 5 provides each new object with a base ID. The base ID guarantees that the object can be found in the metadata model 15. The base ID is unique and stable for each object, i.e., it never changes.

COS 5 also facilitates communication between the query engine 30 and the metadata model 15.

The most important objects in COS 5 are, the gateway; the gateway broker; the gateway factory; and the transaction.

The gateway object is responsible for providing secure access to the objects in the metadata model 15. The gateway may be viewed as an intersection of the user and the repository. Multiple users can work with the same repository at the same time. Each such user will have one separate gateway to this particular repository. A single user can work at the same time with multiple repositories and have a separate gateway object for each repository.

The gateway factory is a globally available single object responsible for creating and registering new repositories.

The gateway broker is a globally available single object responsible for opening existing repositories, enumerating the registered repositories, associating repository names with path/locations.

The transaction isolates the changes that the user makes to the objects of the metadata model 15. Thus, two or more users cannot make changes to the same repository objects simultaneously.

There are three types of transactions, namely, Physical, Undo and Checkout.

A checkout transaction is used to isolate changes made by one user from other users until those changes are complete. Checkout transactions can include one object or many, depending on the task. Checkout transactions can last days, and spans multiple invocations of the user interface. Any change to an object's state checks out the object automatically. New objects are checked out to the user that created them.

If a user determines that a set of changes are valid, they may be checked in. A user may also discard any changes by un-checking his changes.

Objects will be checked out automatically when the user attempts to change their state. When an object is checked out to a user, all other users will only be able to view this object in the way it was at the moment of being checked out. Any attempt by other users to change, delete or check out an object already in the locked state due to another user action will fail.

The object itself is aware of the fact that it is being changed, and who is making the changes. Until the user makes a decision to make the changes permanent and applies a check in method to the object in order to save these changes, the object is carrying around two data blocks. The first data block contains information in the original object status at the check out moment, and the second data block contains the changed object status. Once the object is checked in back to the repository, these changes contained in the second data block become permanent. The object in its brand new state becomes visible and available for further possible actions to all other users.

A checkout transaction has two possible outcomes. If the user determines that the changes are correct, they can be made permanent. In this case, the data block that kept information about the original object's state is discarded. If the user determines that the changes are incorrect, or unwanted, they can be discarded, in which case the data block that kept information about the changes is discarded.

An object that has not been checked out is considered to be in the normal state, in which case it has the same content for all users.

New objects are created such that they are considered checked-out by the user that created them, thereby making them visible to that user only.

An object will be checked-out for a user when it is deleted, if necessary. An object that is checked-out by a user and deleted will not be visible to that user, but will remain visible to others until the checkout user checks-in the deleted object. When the checkin occurs, the object is permanently removed from the repository.

The undo transactions allow users to undo changes to the repository during a single invocation of the user interface. This type of transaction is applicable to each logical unit of work. Undo transactions are nested inside checkout transactions.

Physical transactions are supplied by the repository. Because of the volume of objects that may be manipulated in a single Undo transaction, the Undo transaction is typically subdivided into a series of physical transactions.

There are two types of physical transactions, namely, read-only and read-write. A read-only transaction provides read-only access to objects in the repository. A read-write transaction provides the user with the ability to change objects.

All the changes are performed as a series of atomic consistent isolated durable (ACID) database transactions.

Changes to an object may affect other objects based on the relationships that object has with other objects in the model.

The user can check the integrity of the metadata model at any time by calling explicitly the metadata check method.

Thus, COS 5 maintains object persistence in the repository. COS 5 also performs house keeping and maintenance of objects as operations are performed, such as copy, paste, move, delete. COS 5 insures that these operations are executed in a consistent manner.

COS 5 includes a modelling language, which is used to describe the objects stored in the repository. The modelling language reduces the amount of coding that required to be done. In the preferred embodiment, the modelling language produces C++ code is used. COS 5 also provides transaction management and repository services.

COS 5 defines proxy objects, which act as stand-ins for other repository objects in a specific context. Any modifications made to the original object are exposed through the proxy. The modelling language supports automatic generation of C++ classes that implement object proxies, saving the error-prone, tedious work manually writing this code.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A metadata model defining model objects to represent one or more data sources, the metadata model comprising:
   a data access layer containing one or more data access model objects that describe how to retrieve data from the sources;
   a business layer containing one or more business model objects that represent the structure of the business to be used in business intelligence environments and;
   a package layer containing one or more package model objects which reference subsets of business model objects.

2. The metadata model as claimed in claim 1, wherein the data access model objects include one or more data access model object that are constructed from metadata in the data sources.

3. The metadata model as claimed in claim 1, wherein the business model objects include one or more business model object that are imported form a metadata repository.

4. The metadata model as claimed in claim 1, wherein the business model objects include one or more business model objects that describe business rules.

5. The metadata model as claimed in claim 4, wherein the business model objects that describe business rules include one or more calculations that use a combination of other business model objects.

6. The metadata model as claimed in claim 4, wherein the business model objects that describe business rules include one or more filters that limit a scope of data retrieval through one or more selected business data objects.

7. The metadata model as claimed in claim 4, wherein the business model objects that describe business rules include one or more prompts.

8. The metadata model as claimed in claim 1, wherein the business model objects further include one or more business model objects describing display rules.

9. The metadata model as claimed in claim 8, wherein one of the business model objects that describe display rules is a display style.

10. The metadata model as claimed in claim 1, wherein the package model objects include one or more package model objects that are imported from a metadata repository.

11. The metadata model as claimed in claim 1, wherein the data sources include one or more databases that contains one or more tables having columns;
   the data access model objects include table objects that describe definition so of the tables contained in the data sources, and column objects that describe definitions of the tables contained in the data sources; and
   the business model objects further include entities that are constructed based on the table objects in the data access layer, and attributes that are constructed based on the column objects in the data access layer.

12. The metadata model as claimed in claim 1, wherein the data sources include one or more files;
   the data access model objects include file objects that describe definitions of the files contained in the data sources; and
   the business model objects further include entities that are constructed based on the file objects in the data access layer.

13. The metadata model as claimed in claim 1, wherein the data sources include one or more cubes;
   the data access model objects include cube objects that describe definitions of the cubes contained in the data sources; and
   the business model objects further include entities that are constructed based on the cube objects in the data access layer.

14. The metadata model as claimed in claim 1, wherein the business layer further contains one or more business model objects that describe a business view of data in the data sources.

15. The metadata model as claimed in claim 14, wherein the business model objects that describe a business view are transformed from the data access object.

16. A metadata model containing model objects representing on or more data sources, the data sources containing tables having columns, the metadata model comprising:
   a data access layer containing data access model objects, the data access model objects including table objects that describe definitions of the tables contained in the data sources, and column objects that describe definitions of the columns of the tables contained in the data sources;
   a business layer containing entities hat are constructed based on the table objects in the data access layer, and attributes that are constructed based on the column objects in the data access layer, and one or more business model objects that represent structure of the business to be used in business intelligence environments; and
   a package layer containing one or more package model objects that define subsets of the business model objects.

17. The metadata model as claimed in claim 16, wherein the data access model objects further include one or more data access joins that describe relationship between multiple table objects.

18. The metadata model as claimed in claim 16, wherein the data access model objects further include one or more data access keys, each data access key being a collection of columns whose composite value is distinct for all rows in a table in the data sources.

19. The metadata model as claimed in claim 18, wherein the business model objects further include one or more business keys that are constructed based on the data access keys.

20. The metadata model as claimed in claim 16, wherein the business model objects further include one or more business joins that describe relationship between multiple entities.

21. The metadata model as claimed in claim 20, wherein the business joins include one or more a containment joins, each representing a strong relationship between entities.

22. The metadata model as claimed in claim 20, wherein the business joins include one or more reference joins, each representing a relationship between entities, one of which entities functions as a look-up table.

23. The metadata model as claimed in claim 16, wherein the business model objects that represent structure of the business further include one or more subtype relationships that define an inheritance relationship between two business entities.

24. The metadata model as claimed in claim 16, wherein the data sources further include one or more views, and
   the data access layer contains table objects that are created based on definitions of the views and a list of columns that is obtained from the views included in the data sources.

25. The metadata model as claimed in claim 16, wherein the data sources further include one or more stored procedures, and
   the data access layer contains a list of columns that is obtained from the stored procedures included in the data sources.

26. The metadata model as claimed in claim 16, wherein the business model objects that represent the structure of the business describe business rules.

27. The metadata model as claimed in claim 26, wherein the business model objects that describe business rules include one or more calculations that use a combination of attributes.

28. The metadata model as claimed in claim 26, wherein the business model objects that describe business rules include one or more filters that limit a scope of data retrieval through one or more selected entities and/or attributes.

29. The metadata model as claimed in claim 27, wherein the business model objects that describe business rules include one or more prompts.

30. The metadata model as claimed in claim 16, wherein the business model objects further include one or more business model objects describing display rules.

31. The metadata model as claimed in claim 30, wherein one of the business model objects that describe display rules is a display style.

* * * * *